Dec. 26, 1961     G. H. APPEL     3,014,273
COLD FORMING METHODS Filed Jan. 6, 1958     8 Sheets-Sheet 1

FIG. 1

INVENTOR.
GERHARD H. APPEL
BY *Cullen & Canton*
ATTORNEYS

Dec. 26, 1961  G. H. APPEL  3,014,273
COLD FORMING METHODS
Filed Jan. 6, 1958  8 Sheets-Sheet 5

INVENTOR.
GERHARD H. APPEL
BY Cullen & Cantor
ATTORNEYS

Dec. 26, 1961   G. H. APPEL   3,014,273
COLD FORMING METHODS
Filed Jan. 6, 1958   8 Sheets-Sheet 6

INVENTOR.
GERHARD H. APPEL
BY
Cullen & Cantor
ATTORNEYS

Dec. 26, 1961 G. H. APPEL 3,014,273
COLD FORMING METHODS
Filed Jan. 6, 1958 8 Sheets-Sheet 7

INVENTOR.
GERHARD H. APPEL
BY Cullen & Cantor
ATTORNEYS

United States Patent Office 3,014,273
Patented Dec. 26, 1961

3,014,273
COLD FORMING METHODS
Gerhard H. Appel, Windsor, Ontario, Canada, assignor to Appel Process, Ltd., Oshawa, Ontario, Canada, a corporation of Canada
Filed Jan. 6, 1958, Ser. No. 707,419
6 Claims. (Cl. 29—552)

The present invention relates to the cold forming of metal and more specifically to a process by which the metal workpiece is first made plastic by a prolonged application of force to the surface of the workpiece after which a continued application of such force forms the metal to desired shape and likewise imparts certain desired improvements to the metal, such as improved metallurgical characteristics including changes in grain structure, surface condition, and other physical properties.

It will be understood that this application is a continuation in part of my prior application, Ser. No. 450,500, of August 17, 1954, now abandoned in favor of a continuation in part application Serial No. 732,866, of May 5, 1958, now Patent No. 2,986,051, of May 30, 1961, which has been restricted to apparatus only.

An understanding of the process may be obtained upon reference to the appended drawings which show diagrammatically a machine for carrying out the process and also which show diagrammatically the operation of the forces produced by the machine upon the workpiece.

In these drawings,

FIG. 8 diagrammatically compares the process hereof with rotary swaging;

FIGS. 9 and 10 compare the forming operations on a mandrel, with FIG. 9 showing cold forming hereof and FIG. 10 showing rotary swaging;

*Preliminary discussion*

While certain preferred procedures will be described and certain preferred embodiments of machine structure will be disclosed, all in sufficient detail to enable those skilled in the art readily to practice the invention, it should be understood that such disclosure is not intended to limit the scope of the appended claims to what are essentially simply optional matters but on the contrary, the claims are intended to cover all equivalents falling within the spirit and scope of the invention.

It will further be understood that essentially the process hereof operates first to plasticize a metal workpiece and thereafter to knead and press and shape and form the plastic workpiece to the desired shape with an attendant change of characteristics of the workpiece, particularly with reference to grain structure, physical properties, surface finish, and the like.

*The machine*

Figure 1:
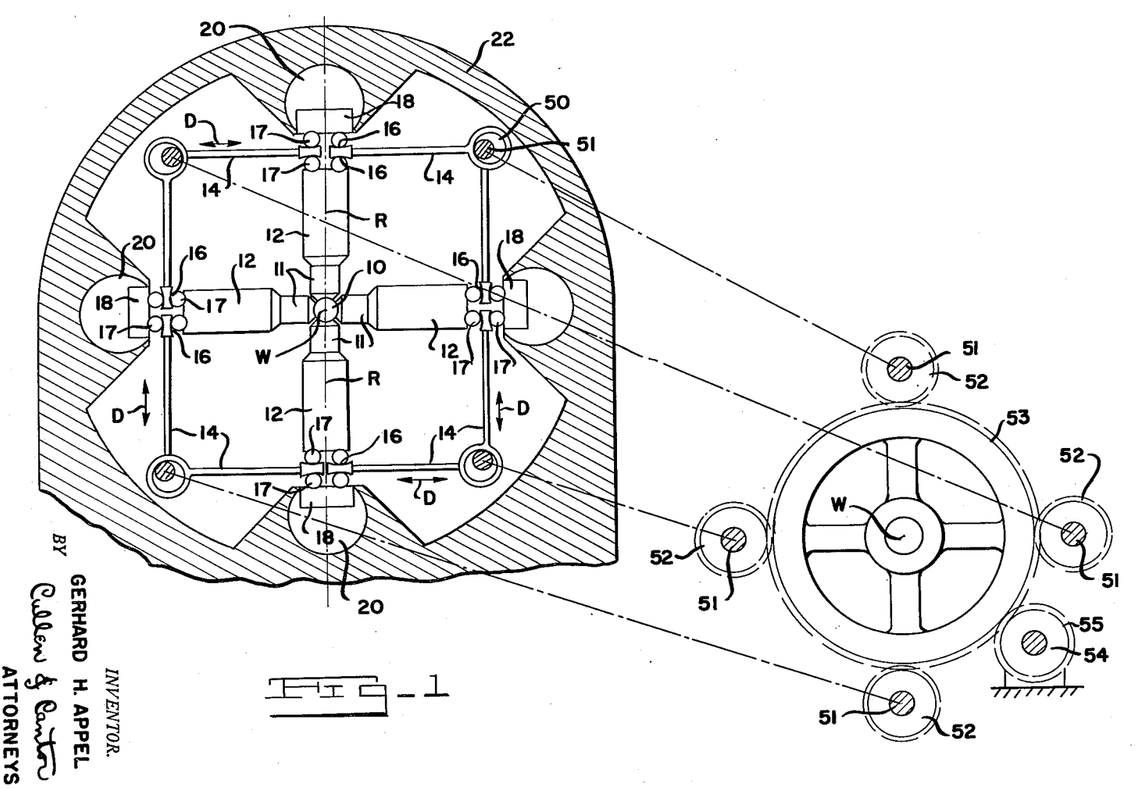
FIG. 1 is an end-wise diagrammatic view of a machine with a workpiece therein.
Figure 2:
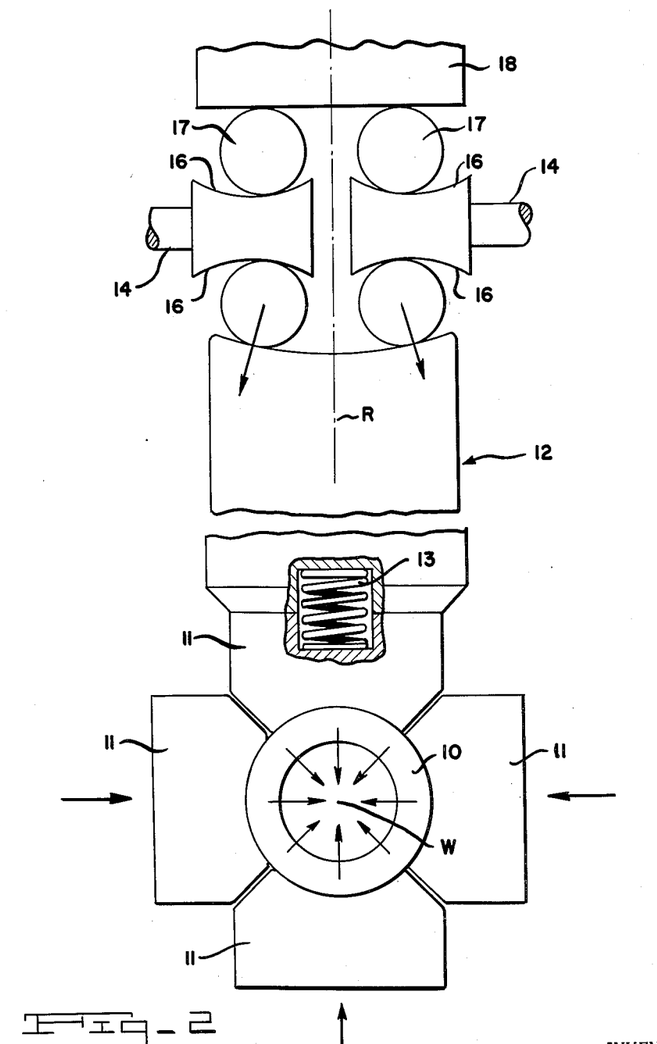
FIG. 2 is an enlarged fragmentary view, also diagrammatic, showing the application of forces to the workpiece.

The drawings and particularly FIGS. 1–2 show a forming machine wherein a metal tube or rod-like workpiece 10 moves longitudinally in a path that is defined as a workpiece axis W so as to be formed by dies 11, four being shown for example, under the pressure of die movers 12 which are constantly biased for separation by coil springs 13 between the dies and die movers. The parts 11—12—13 are parts of four forming sets arranged around the workpiece axis W on radial axes R normal to the workpiece axis W and these radial axes define paths of forming movement of the dies 11. Each forming set also includes a set of drivers or connecting rods references generally 14, two per set, each having two concave or V-shaped curved driver cams 16 on its opposed faces for cooperation with two rollers 17, a stationary anvil or backing element 18, a die mover 12 and a die 11. Reciprocation of the drivers in paths D normal to the radial axes R and also normal to the workpiece axis W causes the curved concaved driver cams 16 to bias the rollers 17 along the radial axes R against the backing elements 18 and against the die movers 12 to cause these to bias the dies 11 and move them for forming radially towards axis W.

Wedges 20 between the backing elements 18 and fixed structure 22 are employed for adjustment of stroke position.

The faces of the dies 11 engaging the workpiece 10 substantially completely encircle the surface of the workpiece. The dies move radially towards the exact center or axis W of the workpiece. Due to the action of the concave curved cams herein disclosed the die forces project towards the center of the workpiece and increase progressively without rebound.

The process is basically a forming operation with the workpiece formed or shaped by modulated forces.

The feed of the workpiece longitudinally on axis W, with or without its rotation on axis W, is interrupted to be synchronized in off-beat relation to the action of the dies. The rate of interruption of feed is dependent upon the rate of forging, that is to say the number of strokes per minute. The rate of forming, feed and rotation of the workpiece on its axis W as it is fed are all variable and are determined by the type of material being formed, the dimensions, and the required deformation.

The various drivers or connecting rods 14 are interconnected by eccentrics at 50 which rotate on axes parallel to axis W so that an equilibrium of forces is achieved at each forming set, the two drivers of a set approaching simultaneously or retreating simultaneously in order to establish the necessary action and forces and to preserve equilibrium.

Two eccentrics 50 are eccentrically and at 90° displacement located on each shaft 51. The four shafts 51 are parallel and are journalled in the housing and have pinions 52, all meshing with a ring gear 53, coaxial with axis W and driven by a motor 54 and pinion 55. Thus, shafts 51 rotate continuously and their eccentrics 50, 90° apart, continuously receiprocate the driver rods 14 on driver axes D to impart radial loads only to the dies 11 on radial axes R.

It has previously been emphasized that in the present machine and method the forces on the workpiece are directed radially towards the exact center W of the workpiece. This result can easily be observed to be present in the machine because of the action of the oppositely moving cams and rollers acting on the radial axes R. All radial axes meet on the workpiece axis W.

The dies move radially only. This is true of any movement, of any part of the cycles, in any adjusted position, whether the dies are advancing or retreating. They cannot move transversely and are never subjected to transverse forces. All this is due to the use of two opposing drivers and cams per die.

The forces on the dies are radial only, with transverse components being balanced out by the two drivers per die. If the forces included transverse components, the dies would twist the workpiece material tangentially and impart to it an undesirable grain movement and shaping. Here no grain movement but pancaking due to radial pressures only can take place.

The forces for advancing the dies are the drivers and cam forces. The forces for retracting the dies are the reaction forces of the workpiece. The cams and drivers regulate and control such reaction forces and also prevent transverse forces on the dies, and the forces on the dies, during retraction, as during advance, are radial only.

While four dies are shown, it is obvious that the number can be varied so long as the dies encircle the workpiece substantially completely and move on radii or radial axes R which meet on the workpiece axis W.

Figure 3:
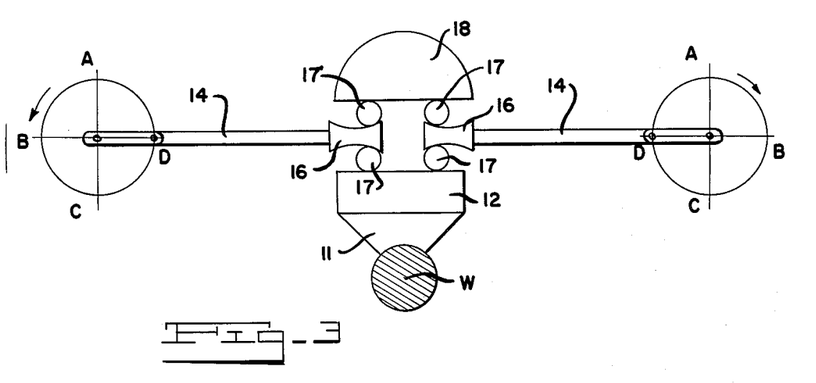
FIGS. 3–3a diagrammatically illustrate the force development in the machine.
Figure 3A:
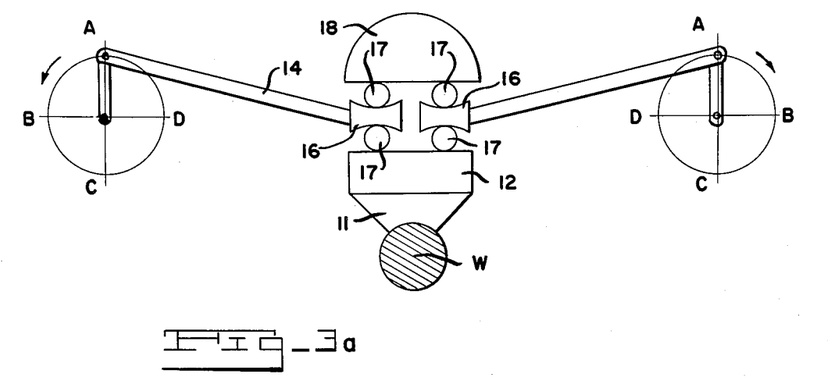
Figure 4:
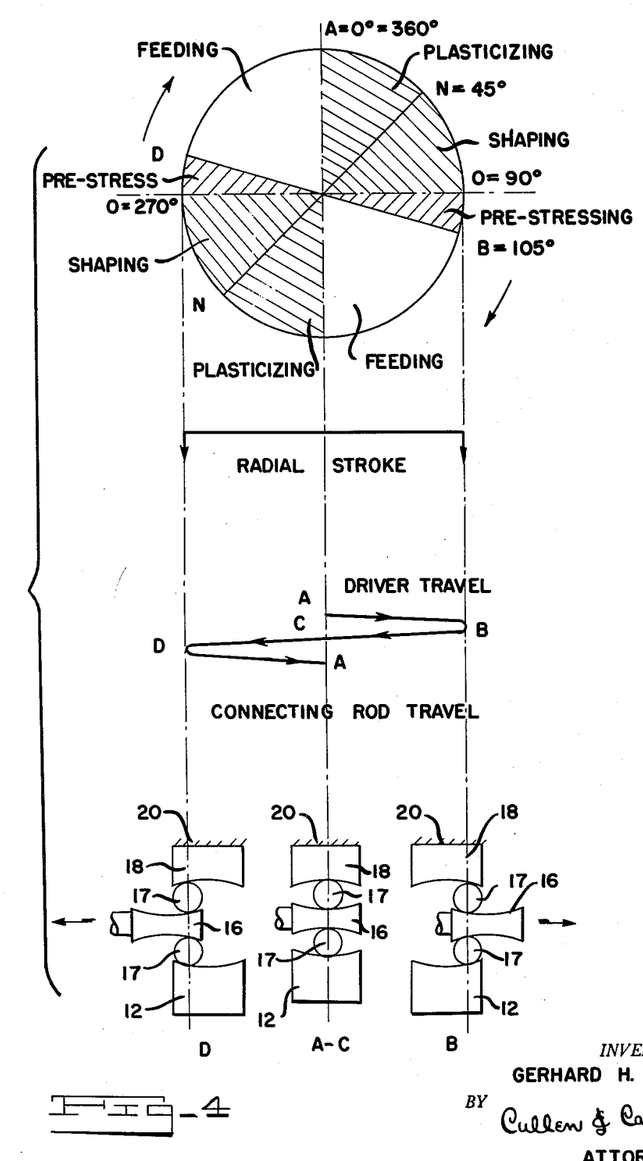
FIG. 4 is a diagram illustrating the relation of forces, distances, and times, and also in animated view, shows the movement of certain parts.

It has also been previously mentioned that one outstanding characteristic of the method is that the forces of the dies moving towards the center of the workpiece increase progressively without rebound. This action is best illustrated upon reference to the diagrams in FIGS. 3–5.

As each eccentric cam at 50 revolves 360° from A thru B, C and D, the travel of the connecting rods or drivers and the force distributions are as follows. The eccentric cams revolve with constant torque and this results in minimum force being applied to the connecting rods or drivers at point A. As the eccentric cams revolve from A to B the drivers travel their full stroke as a push and the force during this stroke increases to a high value reached at B. As this point is passed the drivers move in the opposite direction to reach a neutral point C, with the force decreasing beyond B and reaching a low value at C. At C the drivers continue to move toward D, all the time exerting an increasing force while a second forming interval (C—D) occurs until point D is reached and the drivers move once more to the neutral position A whereupon the forces again reduce to the same low value as at C. The eccentric cams have now rotated one full cycle of 360° with two forming intervals A—B and C—D and two feeding intervals B—C and D—A.

The forming cams will now be considered. Forward and backward movement of the drivers increases the distance between the die and the anvil. Due to the curved concaved shape of the cams, the loads are lowest on the rollers when the loads are highest on the drivers and vice-versa. The loads are lowest and the velocities highest at the rollers when the loads are highest and velocity lowest on the driver rods, and vice-versa. This tends to balance the loads and equalize the velocity to a lower overall velocity and results in low wear and long life of the rollers and cams.

The loads increase gradually during the plasticizing, from A to N, and during the displacing, from N to O; that is to say, the loads increase gradually from the start of plasticizing, which starts at the inside, to the end of plasticizing, which ends at the outside, and then the increase of loads continues to the end of displacement which follows plasticizing.

The velocity of the die is a function of the velocity of the shafts and drivers on the one hand and of the cams and rollers on the other. Since $V_s$ (shaft) is highest when $V_c$ (cams) is lowest, and vice versa, the $V_d$ (die), a function of both, is about constant during all the forming time. Since $V_d$ (die) is constant, it can be and is maintained below the $V_d$ that would fracture the material. Hence, possibility of fracture is eliminated.

Similarly, $V_d$ (die) may be maintained at a level low enough to prevent machine vibration and breakdown due to excessive velocities of the dies.

The ratio of force distribution and travel between the drivers and the dies is approximately 5 to 1 in the embodiment shown.

The action of the die cams as contrasted from the action of conventional forging hammers causes a progressive increase without rebound of the forces radially towards the workpiece axis W.

Figure 5:
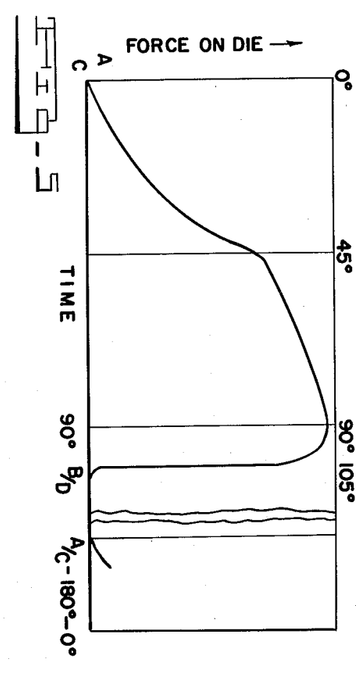
FIG. 5 is a force time diagram.
Figure 6:
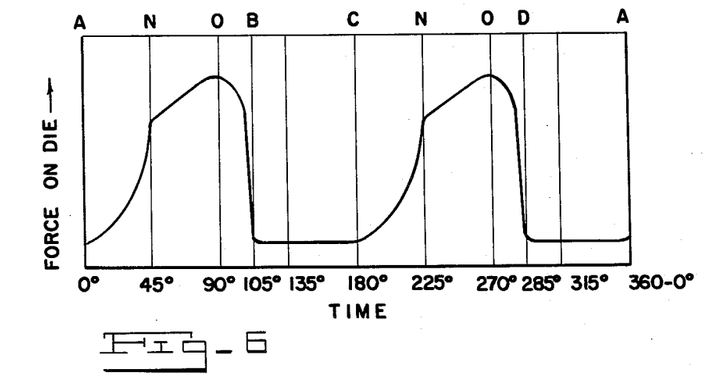
FIG. 6 is a diagram relating forces to time in the process hereof.
Figure 7:
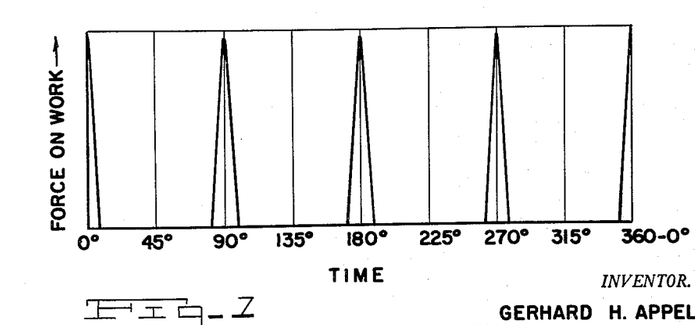
FIG. 7 is a diagram relating forces to time in a conventional forging operation.

This result can also well be understood upon a comparison of FIGS. 5–7. FIGS. 5–6 show the relation of forces to time in the construction hereof whereas FIG. 7 shows a conventional construction force-time diagram.

The resultant of the forces as illustrated in FIGS. 5–6 together with the spring loading of the dies in conjunction with the die movers creates a reaction on the workpiece as shown in FIGS. 5–6. At the beginning of the forming interval A, 0°, the forces are applied to the workpiece through the dies and at first increases rapidly and uniformly. The workpiece then (A–N) is being deformed elastically and plasticized under the loads of the cams and drivers. Thereafter, from N to O the deformation is a shaping or displacement of the plasticized mass. All the while the force increases between A and O.

At O the force begins to reduce and elasticizing takes place until at B the forces reach a low value and feeding takes place at point B to point C where a new forming interval begins and continues past points N, O, to D where the forming interval ends and a second feeding interval begins with a complete cycle ending at point A again, 360°.

During the feeding interval there is a small force from B to C and from D to A applied to the dies to prevent bouncing. During the forming interval the forces progressively increase on the workpiece and are directed to the exact center W of that workpiece.

The forces increase gradually during plasticizing AN, CN; and during shaping NO, NO; and decrease during elasticizing OB, OD; and all forces are truly radial, with no transverse components.

All of the foregoing can be contrasted to the conventional method and construction whose force diagram is shown in FIG. 7 which shows, in conventional forging, that the hammer blows are widely spaced and of short duration.

It will be observed that the workpiece is acted upon by a uniformly distributed radially directed external pressure around its circumference and that such pressure gradually increases to reach a value which creates sufficient stress in the material to pass the yield point and to cause movement of the strained structure in a cold plastic condition.

The four dies gradually close in upon the workpiece simultaneously with equal forces moving towards the workpiece axis W.

Due to the wedge shape of the increments of mass of the tubular or round workpiece the unit load of the die forces will be greater at the axis W than on the surface of the workpiece with the result that plasticizing of the metal will take place gradually and progressively first at the axis W and gradually towards the exterior of the workpiece. Ultimately, plasticity will reach from the axis W to the exterior and cover the whole mass of the workpiece within the longitudinal extent of the dies and the plasticity of the workpiece will extend completely throughout the mass.

It will be observed that an important aspect of the invention is the nature of the radial movement imparted to the dies by the cams and drivers. This movement is not the same as an ordinary hammer stroke but is a gradual but rapid building up of pressure upon the dies with consequent rapid and gradually built up movement of the dies inwardly in response to the coaction of the cams and the rollers. The dies are rapidly forced to move inwardly but the pressure upon them is not relieved immediately after being applied as would be the case with an ordinary hammer stroke. Instead it is a pressure and a constantly building up pressure that is applied to these dies that moves them inwardly and rapidly and maintains pressure and inwardly movement of the dies even after the dies have moved initially AN, CN, for plasticizing the material. The second part of the moving NO, NO, is a kneading action and this effects the desired shaping and form as well as physical and surface characteristics of the workpiece material.

The third part of the movement, OB, OD, is an elasticizing step, with relieving of loads and forces being gradual, and under the restraint and control of the curved concave cams and rollers, the shaped plasticized material solidifying and elasticizing in the formed shape gradually from outside to inside, and becoming prestressed, tension outside, compression inside.

The action of the dies is such as to cause plastic flow of the workpiece grains and material longitudinally as well as radially but the radial forces and flow of material are increased to a maximum and the longitudinal flows are reduced to a minimum. The workpiece is held stationary under the dies during the plasticizing, forming, and elasticizing part of a forming and feeding cycle and only when the dies are released for feeding is the workpiece moved forward.

Experience has shown that while longitudinal flow of the plastic material cannot be eliminated completely, that when such flow occurs its direction will be into the deforming section of the dies and thus the flow will be changed to a more or less radial flow by the movement of the dies which is the desired result.

The workpiece may be a solid workpiece or a tubular workpiece as desired. The forming operation may be performed with or without a mandrel. When no mandrel is used, the forming operation achieves correct sizing and dimensioning of the outside, as well as change of physical characteristics, grain structure, surface, and so forth, but when a mandrel is used the workpiece, already in a plastic state, comes into contact with the mandrel and its interior is shaped to the mandrel shape.

Experience has shown that the radial die forces are considerably higher when the forming is done with a mandrel than without.

Likewise, the proportions of radial deformation to longitudinal deformation or the ratios are increased when the forming is done with a mandrel but in every case the amount of radial deformation is greater than longitudinal deformation. This is true only until the mandrel cavities are completely filled. When this occurs, the only deformation from this movement on is longitudinal deformation.

Figure 9:
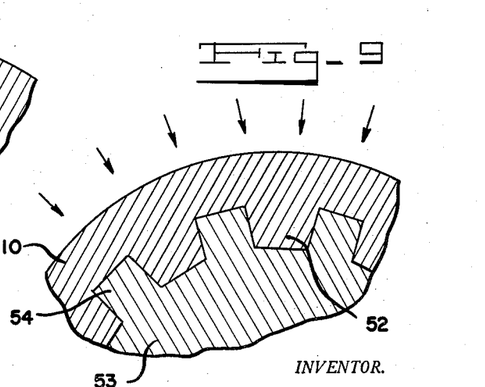
Figure 10:
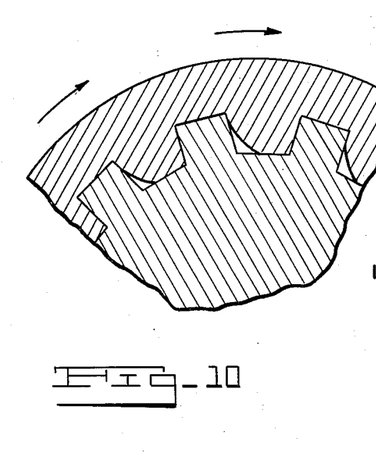

In addition, as illustrated in FIGS. 9 and 10, the radial action of the dies in the process hereof (FIG. 9) forces the metal into positions more completely filling and actually completely filling cavities 52 of the mandrel 53 or grooves 52 between ribs 54 of the mandrel and orients the metal grains in a manner far more satisfactory than would occur simply by rolling of the metal into the grooves or cavities of the mandrel in ordinary rotary swedging (FIG. 10).

It will be observed that the workpiece may, if desired, be rotated on its axis as it is fed into the dies. This is particularly true where the workpiece is round in its finished form. However, such rotation is not necessary and may be dispensed with, as for example where the workpiece is of hexagonal surface in finished form.

*Metallurgical characteristics*

FIGS. 11 to 18 compare metallurgical characteristics of objects formed by cold forming according to the present method against those formed by cutting out as by broaching.

Figure 11:
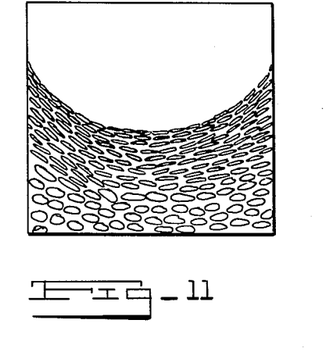
FIGS. 11–12 are diagrammatic micro-photographic views comparing grain structure after cold forming by the method hereof and by broaching or cutting.
Figure 12:
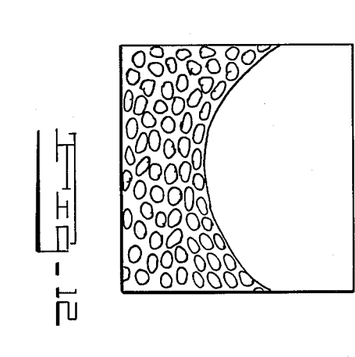
Figure 13:
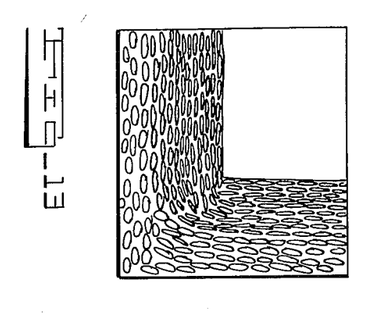
FIGS. 13–14 are views like FIGS. 11–12 of differently shaped parts.
Figure 14:
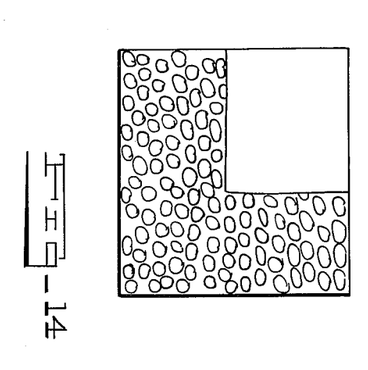

FIGS. 12 and 14 show crystal or grain structure diagrammatically of cut fragments whereas FIGS. 11 and 13 show the crystals elongated and re-oriented to flow along the inner surface of the workpiece which was formed by the process hereof, a process which deforms and elongates not only the grains but also includes impurities. This results in a structure which has considerably greater strength across the grain than with the grain.

The elongation of the grain hereof is in two dimensions, longitudinal, and lateral as well (pancake) due to slip plane movement; as contrasted from elongation in one dimension only (pencil).

A grain is roughly spherical. By other processes it elongates in one direction (a pencil). By my method, it elongates in two directions (a pancake). Where two grains are adjacent and both are pancaked out, the workpiece of such two grains is also elongated and pancaked. This results in a fair stronger workpiece than where the two grains are pencilled out, because a pancake gives greater surface area per unit than a pencil. Since internal cohesion of grain to grain partially determines the yield point of the metal, and is a function of surface areas in adhesion contact, it is clear that the process hereof, pancaking the grains, increases metal strength.

As is well-known with cold forming, the method hereof increases the surface as well as interior hardness of the metals to a very considerable and in fact on the surface to a maximum extent.

Figure 15:
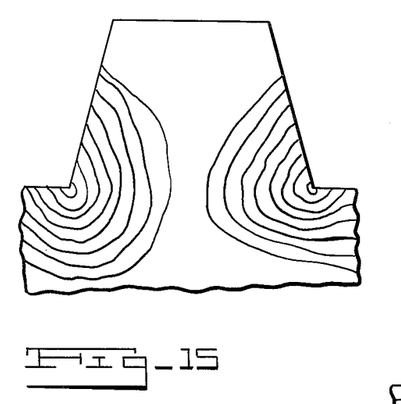
FIGS. 15 and 16 contrast force lines in parts produced by the cold forming method hereof and by conventional methods.
Figure 16:
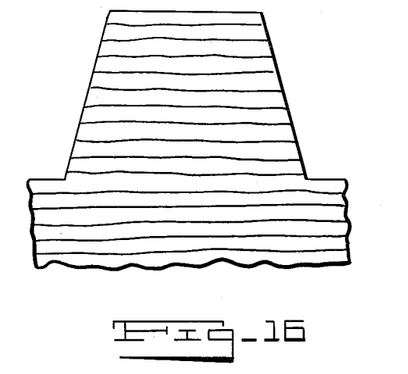

Shear strength of the metal is likewise improved by the cold forming process hereof. FIGS. 15 and 16 show splines formed by cold forming hereof (FIG. 15) and by broaching (FIG. 16). FIG. 16 shows flow lines parallel to the shear forces in the splines formed by cutting of the splines but FIG. 15 shows the flow lines opposing the shear forces when the splines are formed by the present method. The flow lines here are perpendicular to the shear forces and this gives very great strength as contrasted from the situation in FIG. 16 where the shear forces are parallel to the flow lines.

Figure 17:
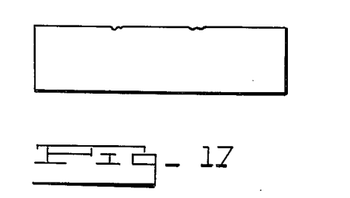
FIGS. 17 and 18 contrast surface characteristics in parts produced by the cold forming method hereof and by conventional methods.
Figure 18:
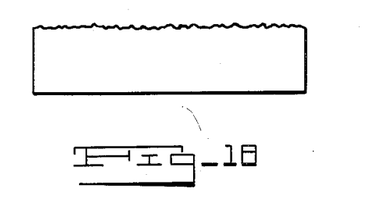

Surface hardness is considerably greater with cold forming by the method hereof as against conventional grinding and lapping methods as illustrated in FIGS. 17 and 18. FIG. 18 shows surface finish diagrammatically where the surface is ground and lapped but FIG. 17 shows the surface diagrammatically where formed by cold forming hereof. In fact, it is possible to obtain a super finish much smoother and harder than the finishes possible to obtain by any other method of surface treatment or machining.

With reference to FIG. 5, we here give some typical examples, as follows:

For a steel known as Rockwell C–60, AN will be $\frac{1}{36}$ of a second; NO will be $\frac{1}{36}$ of a second and OB will be $\frac{1}{108}$ of a second, all these figures being approximate.

For a steel known as mild steel of high ductility, AN will be $\frac{1}{72}$ of a second, NO will be $\frac{1}{72}$ of a second and AB will be $\frac{1}{216}$ of a second.

During the time AN the material is being plasticized; in NO the plastic material is being displaced or formed; in OB the material returns or elasticizers; and AB is the entire forming interval.

Figure 8:
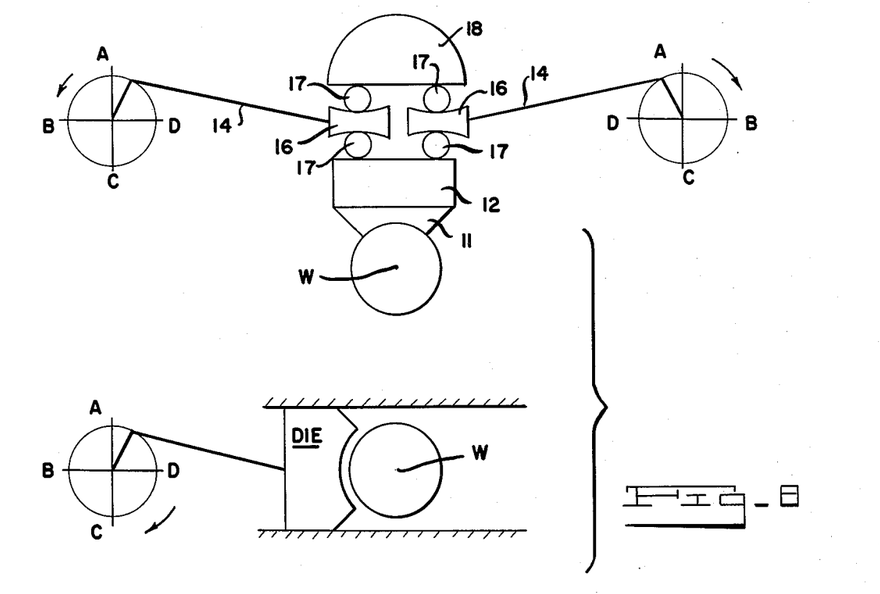

Below are given some comparisons between the process hereof and a rotary swaging process, both being illustrated in FIG. 8.

|   | Process Hereof | Rotary Swaging |
| --- | --- | --- |
| I. Horizontal Pressure At Die. | At A/C—Min.; At B/D—Max. | At A/C—Min.; D—Max.; B—Zero. |
| II. Forming Stroke | A–B; C–D; 2 per revolution. | C–D only; 1 per revolution. |
| III. Reaction of Forming Pressure. | On the anvil or backing plate and not on the bearing for shaft or crank pin. | On the bearing or shaft or crank pin. |
| IV. Direction of Thrust on Die. | Always on radial die axis; has no transverse component and hence requires no wear plates for die. There is no lateral wear nor pressure on the die. | Shifts angularly across the die axis and hence thrust has a transverse component and requires wear plates for die because there is lateral wear and pressure on the die. |

The process hereof has been found operative and useful for cold forming metals hitherto regarded as not useful for cold forming metals, e.g., such as certain hardened or nonductile metals.

This can be arranged simply by increasing the time under load for plasticizing and not displacing the metal until such a time as been permitted. Examples of such metals as these are known to the trade (1) High heat treat; Rockwell C–60. (2) Pure molybdenum. Attempts have been made to cold form such metals but without commercial success, but the method hereof will operate successfully on such metals.

The kneading hereof is a function of both time and amount of die pressure; and a great emphasis is here given to the fact that slowly and gradually is the force applied and likewise relieved. The method hereof is not to be confused with impact methods where great pressures are suddenly and very rapidly and instantaneously applied; nor is it to be confused with non-plasticizing methods where light forces are applied, albeit slowly. The method hereof requires not only a great pressure but also an appreciable, predetermined, and extended time for the forces to be applied, these increasing during the time of application, and the latter being sufficient to enable all of the material to be plasticized before any of it is shaped, with the plasticizing being progressive rather than instantaneous, starting with the inside and continuing to the outside.

The rate of feed depends on the time allowed for the forming part of the cycle, and the length of the dies. In one example, I used 1500 feed intervals per minute for a 10 inch feed. In another instance, the feed is 1500 feed intervals per minute for a 36 inch feed, which means 42 feed intervals per inch of travel of the work.

In addition to feed, the workpiece may be rotated during the feed intervals, for curing gaps between the dies, and to improve the kneading of the work into cavities of the mandrel.

The feed is adjusted to the load capacity of the machine. In one example, a feed of 1500 feeds per minute for 10 inch feed is used, with the capacity of the machine being about 200,000 lbs. In such machine the die travel was .003 inch, a constant figure.

Conclusion

Essentially, the process hereof is a process of subjecting workpieces to radial pressures sufficient to plasticize the workpiece throughout its entire mass and then deform and shape and dimension the workpiece while thus plasticized, with or without a mandrel, and finally gradually elasticizing the materials with a resultant change in the physical and particularly the surface characteristics of the workpiece.

The workpiece may be solid or tubular and if tubular, may be formed with or without a mandrel.

Also, as described in detail in connection with the machine application Ser. No. 450,500 previously identified, the forming feeding cycles are rapidly repeated successively along the workpiece axis and the workpiece is fed in extremely small increments of length between the forming intervals of these cycles.

It is also important to note that the dies remain constantly in contact with the workpiece surface during all of the movement of the parts and that the radial loads cover approximately all of the surface of the workpiece.

The timing is such that the dies are under pressure in contact with the workpiece for two 90° plus intervals approximately during a 360° double cycle; during one complete revolution of the eccentric cams which drives the drivers, the workpiece is under load approximately 50% plus of the time.

It is very important to note that each pressure interval of the die comprises several parts. In the first part, the die is in loaded contact with the workpiece long enough to plasticize it; in the second part, immediately thereafter, the die remains in loaded contact with the workpiece and deforms and shapes the workpiece in its thus rendered and then plastic condition; in the third part, the die controls solidifying and elasticizing of the material gradually, from outside to inside, prestressing it, tension outside, compression inside. The fourth part of a cycle is a feeding and workpiece rotating interval.

In the first, second, and third parts of the cycle, as above, the workpiece portion in the die throat is firmly held within the dies by the feed mechanism which, at that time, is blocked against movement counter to feed. Thus, the workpiece elongates, not counter to feed, but only along feed direction, through the die throat; i.e., forwardly, rather than rearwardly.

However, when the fourth part of the cycle starts, and the block above described is released and feed starts, there is no loaded pressure on the dies at that time. Hence—even here, since there is no force to cause it, there is no elongation of the workpiece counter to feed.

The die pressure, during the first two parts above of the cycle, considering that rearward elongation is at that time inhibited by the block of the feed means, causes radial deformation and forward elongation through the die throat. Radial deformation improves the grain structure (pancaking) and increases the degree of filling of mandrel cavities where a mandrel is used.

We note here that blocking the workpiece against rearward elongation enhances the degree of radial deformation. This is desirable for reasons expressed above.

After the workpiece has been plasticized and then displaced, the return of the material to solid or elastic condition is controlled and restrained by the elasticity of the machine housing and parts, operating during the time of movement of the roller from the end of the curved cam to the center, a matter of about 15°. This, in interval OB, OD, results in the workpiece becoming desirably prestressed, tension outside, compression inside. The cams and rollers prevent free and unrestrained return or elasticizing of the metal, but control it, so that it is not sudden (0°) but gradual (15°).

The outside solidifies first and slowly and progressively thereafter the interior solidifies, stressing the outside in tension, and becoming compressed internally. This gradual relieving of load, accomplished and controlled by the cams and rollers, prestressing the workpiece as stated, is in contrast with what would happen if the loads were suddenly relieved, as if there were no cams giving a time control. Sudden relief would permit the material to solidify entirely suddenly, not becoming desirably prestressed, and creating a danger of fracture.

The tougher the workpiece material and/or the larger the area thereof under the dies, the greater is the load on the machine housing and consequently the greater is the housing reaction on the material during elasticizing—and hence, the greater is the degree of prestressing the material as described above.

Elasticizing is longer in time OB, OD when such reaction load on the machine is greater, and hence feed time BC, DA is reduced. This explains why feed is slowed down for greater reaction loads due to less ductile more difficult materials.

Elasticizing, in typical swedging machines, is sudden, rather than gradual, as here, and is manifested by bouncing, as contrasted from the smooth purr of the machine hereof.

Elasticizing herein is controlled by the cams. Their curves give a gradual relief to the loads, controlling the elasticizing forces. Hence, the curving of the cams is here of importance.

Now having described the process hereof, reference should be had to the claims which follow.

I claim:

1. A method for cold forming a cold metal workpiece having a central axis comprising loading substantially the entire outer periphery of a single increment of the workpiece with forces that are inwardly directed and which resolve into force components which are either radial to the workpiece axis or are normal to radii of the workpiece and tangent to a hypothetical circle whose axis is the axis of the workpiece; and with all of the radial force components being in balance at the axis of the workpiece and with each of said normal force components being balanced by another equal and opposite normal force component; there being no forces at any time which do not resolve into truly radial components or normal-to-radii components and no unbalanced forces so that there is no tendency for the workpiece to rotate about its axis under the applied load; said loading being characterized by being rapidly applied and removed in a uniform time pattern; applying the loading to successive increments of the workpiece; and changing the increments upon which the loading is applied during the load removed time of the loading time pattern.

2. In a method for cold forming an elongated, rod-like, metal workpiece, whether hollow or solid, comprising simultaneously applying to the surface of a minute increment of the metal workpiece at least three, radially arranged, inwardly directed, equally spaced, equal and opposed pressures engaging and substantially completely girdling the workpiece; in such method, that improvement which comprises applying the pressures to the workpiece by at least three radially arranged pressure applying tools, each of which is subjected to two opposing, equal, transverse forces, each of which transverse forces has a transverse component and a radial component, the transverse components being directed so that they are equal and opposite and thus balance themselves out, leaving only a net radial resultant directed along an extension of the radius of the workpiece and towards the central axis of the workpiece so that each force on a tool which applies pressure to the workpiece is truly radial to the workpiece and has no unbalanced transverse components.

3. In a method for cold forming an elongated rod-like metal workpiece, whether hollor or solid, which method comprises applying to each of many longitudinal adjacent minute increments of a metal workpiece, in successive steps, so as to extend over substantially its entire exterior surface, at least three, radially arranged, inwardly directed, equally spaced, equal and opposed and simultaneously applied pressures engaging and substantially completely girdling the workpiece; in such method that improvement which comprises applying the pressures to the workpiece by at least three radially arranged pressure applying tools, each of which is subjected to two opposing transverse forces, the two opposing transverse forces being so directed that their transverse components are equal and opposite and thus balance themselves out, leaving only a net radial resultant of the two forces, so that each force on a tool which applies pressure to the workpiece becomes truly radial and has no unbalanced transverse components, and so that the pressures on the workpiece applied by each pressure applying tool are balanced out by equal and opposite pressures applied by the remaining pressure applying tools.

4. A method for cold forming an elongated metal workpiece, hollow or solid, having a central axis, comprising the steps of surrounding substantially the entire outer peripheral surface of a single axial increment of the workpiece with at least three opposed tools, each having an axis which is arranged radial relative to the workpiece central axis; simultaneously loading all of the tools by subjecting each of them to two equal and opposing forces which are transverse relative to the tool axis and which are so arranged as to balance out all transverse components of said two opposing forces and leave only a radial resultant which radial resultant is directed towards the workpiece central axis along the tool axis, whereby the resultant load on each tool is radial and has no unbalanced transverse components, and with the said radial resultant on each tool being equal to the radial resultant of every other tool; moving the tools under the influence of their respective radial resultant loads into engagement with the workpiece increment for transmitting the respective resultant loads to the workpiece and thereby applying pressure to the workpiece for forming it.

5. A method for cold forming a metal workpiece, hollow or solid, which is elongated and rod-like in shape and thus has an elongated central axis, said method employing at least three pressure applying tools which are equally spaced on workpiece radii circumferentially around the periphery of the workpiece in a plane normal to its axis and which tools girdle the workpiece and are movable towards and away from the axis, said method further comprising repeated identical cycles of steps with each cycle including the tools engaging and acting on a small axial increment of the workpiece and with each cycle comprising the steps of gradually and simultaneously moving all of the tools equal minute distances inwardly towards the workpiece axis inwardly of the workpiece surface and under equal loads whereby the tools gradually squeeze the workpiece increment then worked upon until the metal in that workpiece increment flows and the periphery of that workpiece increment assumes the shape of the tool faces engaging the workpiece; then stopping the inward movement of the tools and holding the tool loads for a short time; and then retracting the tools away from the workpiece axis; and then moving the workpiece axially through the tools to present a succeeding increment of the workpiece to the tools; and repeating the cycles until all increments of the workpiece from one end to the other have been successively engaged and formed by the tools; in such method, that improvement which comprises applying the pressures to the workpiece by subjecting each of the tools to two opposing transverse forces each of which forces have transverse components and radial components and with their transverse components being so directed that they are equal and opposite and balance themselves out leaving only a net radial resultant so that each force on each of the tools, which applies pressure to the workpiece, is truly radial and has no net or unbalanced transverse components.

6. A method for cold forming an elongated metal workpiece, hollow or solid, having a central axis comprising numerous identical cycles of steps, with each successive cycle acting upon a successive single axial increment of the workpiece, each cycle comprising essentially the steps of surrounding substantially the entire outer peripheral surface of a single axial increment of the workpiece with at least three opposed pressure applying tools which are arranged radially relative to the workpiece axis; simultaneously loading all of the tools and moving them under the influence of their loads towards and into pressure applying engagement with the workpiece, with the movement of each of said tools being only in the direction of a single radius of the workpiece, with the load on each of the tools being formed of a radially directed resultant force directed only in the same direction as the respective single radius which defines the direction of movement of that tool, and also being formed of pairs of non-radial force components with each non-radial force component of each pair being equal to and opposite to and counterbalancing and cancelling out the other non-radial force component of that pair and with the radially directed resultant forces of each of the tools being equal to one another; holding the tools in a pressure applying engagement with the workpiece for a pre-determined time for forming the workpiece increment; then releasing the loads simultaneously and retracting the tools from the workpiece along the same path in which they moved towards the workpiece.

References Cited in the file of this patent

UNITED STATES PATENTS

| | | |
|---|---|---|
| 874,448 | Smith | Dec. 24, 1907 |
| 1,819,376 | Muller | Aug. 18, 1931 |
| 2,114,302 | Harter | Apr. 19, 1938 |
| 2,197,391 | Biggert | Apr. 16, 1940 |
| 2,410,742 | Newall | Nov. 5, 1946 |
| 2,433,152 | Patnaude | Dec. 23, 1947 |
| 2,617,319 | Richards | Nov. 11, 1952 |
| 2,786,267 | Chappuis | Mar. 26, 1957 |

FOREIGN PATENTS

| | | |
|---|---|---|
| 463,637 | Canada | Mar. 14, 1950 |
| 356,483 | Great Britain | Sept. 10, 1931 |